United States Patent [19]

Gillmore et al.

[11] Patent Number: 4,976,982

[45] Date of Patent: Dec. 11, 1990

[54] REDUCED CALORIE, HIGH FIBER PASTA

[75] Inventors: Stephen R. Gillmore, Cato; Carleton G. Merritt, Phoenix, both of N.Y.

[73] Assignee: Borden, Inc., Columbus, Ohio

[21] Appl. No.: 392,685

[22] Filed: Aug. 11, 1989

[51] Int. Cl.$^5$ ................................................. A23L 1/16
[52] U.S. Cl. .................... 426/557; 426/269; 426/804
[58] Field of Search ............... 426/269, 557, 549, 496, 426/113, 106, 804

[56] References Cited

U.S. PATENT DOCUMENTS

| | | | |
|---|---|---|---|
| 3,574,634 | 4/1971 | Singer | 426/557 |
| 3,762,931 | 10/1973 | Craig et al. | 426/557 |
| 3,843,818 | 10/1974 | Wren et al. | 426/557 |
| 3,992,554 | 11/1976 | Blake et al. | 426/459 |
| 4,042,714 | 8/1977 | Torres | 426/557 |
| 4,526,794 | 7/1985 | Altomare et al. | 426/269 |
| 4,574,174 | 3/1986 | McGonigle | 426/113 |
| 4,832,969 | 5/1989 | Lioutas | 426/615 |
| 4,840,808 | 6/1989 | Lee et al. | 426/557 |

FOREIGN PATENT DOCUMENTS

| | | | |
|---|---|---|---|
| 52-27219 | 7/1977 | Japan | 426/557 |
| 62-158466 | 7/1987 | Japan | 426/557 |
| 63-251057 | 10/1988 | Japan | 426/557 |
| 01-98460 | 4/1989 | Japan | 426/557 |
| 712072 | 1/1980 | U.S.S.R. | 426/557 |
| 1165349 | 7/1985 | U.S.S.R. | 426/557 |

*Primary Examiner*—Donald E. Czaja
*Assistant Examiner*—D. Workman
*Attorney, Agent, or Firm*—Dennis H. Rainear; Kenneth P. Van Wyck

[57] ABSTRACT

The invention relates to a method for preparing low calorie pasta product comprising glutinous flour, an added fiber source, a reducing agent, and water. The use of a reducing agent in the method of the invention neutralizes oxidizers present in or on the surface of the added fiber source whereby improved texture and mouth feel of high fiber-containing pasta is achieved. The amount of corn fiber, soy fiber, oat fiber, etc. in the pasta can be up to about 30 percent by weight without adverse effect on paste texture or color. By replacing some of the glutinous flour in the pasta with bulk fiber, the calorie content of the pasta is reduced.

26 Claims, No Drawings

REDUCED CALORIE, HIGH FIBER PASTA

BACKGROUND OF THE INVENTION

The present invention relates to food products and more particularly to a method for preparing low calorie, high fiber-containing pasta products.

It has long been desired to reduce the caloric content of farinaceous products, including, pasta products such as noodles, spaghetti and macaroni. One method for reducing the caloric content which has been utilized is the introduction into the pasta of various non-nutritive and/or calorie-poor additives. U.S. Pat. No. 3,574,634, issued Apr. 13, 1971 to Singer, teaches the use of vital gluten in combination with non-nutritive edible cellulosic filler and an edible vegetable gum binder. The presence of the non-nutritive filler and vegetable gum binder makes the pasta dough of Singer convertible by heating into palatable products of reduced caloric content.

The use of modified polydextrose (poly glucose) in various dietetic foods is disclosed in U.S. Pat. No. 3,376,794, issued Apr. 9, 1968 to Griffith et al.

U.S. Pat. No. 4,042,714, issued Aug. 16, 1973 to Torres describes a low calorie farinaceous composition modified polydextrose, proteinaceous material, cellulose derivative, and flour.

U.S. Pat. No. 3,843,818, issued Oct. 22, 1974 to Wren et al., discloses a low calorie pasta comprising polygalactomannan gum, cereal material, vegetable protein and water. Wren et al., achieves low calorie content by increasing the water content and also substituting polygalactomannans for some of the starch in conventional pasta products. Wren et al., also requires relatively high extrusion temperatures of 55° to 98° C.

U.S. Pat. No. 3,992,554, issued Nov. 11, 1976 to Blake, et al., teaches the preparation of a pasta product in which bulk is increased with the addition of certain non-assimilable material together with increased water content. Specifically, Blake et al., uses oil seed endosperm cell wall residue as the non-assimilable component for reducing the calorie content of the pasta.

It is also known to treat pasta dough, or flour being made into pasta dough, with various modifiers, additives and agents for various purposes including color retention, improved nutritive value and greater pasta yield. For example, U.S. Pat. No. 3,762,931, issued Oct. 2, 1973 to Craig, et al. teaches the addition of edible sulfhydryl reducing substances to alimentary paste for the purposes of reducing moisture content, plasticizing gluten, improving surface characteristics and decreasing drying time of the pasta. Craig et al., does not teach the use of reducing agents to neutralize oxidizers on fibrous materials in pasta.

Known flour treatment agents include, for example, $KBrO_3$, $KIO_3$, azodicarbonamide ($H_2NC(O)N=N-C(O)NH_2$), chlorine dioxide, chlorine gas, benzoyl peroxide, ascorbic acid, and L-cysteine. Of these flour treatment agents, only ascorbic acid and L-cysteine are reducing agents, while the remainder of the agents are oxidizing agents.

SUMMARY OF THE INVENTION

The present invention relates to the use of reducing agents in pasta product formulations comprising fiber product, whereby the reducing agents counteract various oxidizers on or within the fiber product. By the process of the present invention, pasta product with high fiber content is produced which retains desirable flavor, color and exhibits superior texture.

It is an object of the present invention to provide a method of improving color retention in high fiber content pasta products.

It is a further object of the present invention to reduce the calorie content of a palatable pasta.

It is yet another object of the present invention to produce a pasta product able to provide a food source high in dietary fiber, one benefit of which is known to be, among others, reduced likelihood of colon cancer.

Still another object of the present invention is to improve the texture of fiber-containing pasta products.

The present invention is related to the pasta inventions disclosed and claimed in the following U.S. patent applications, all of which are assigned to the assignee of the instant invention: U.S. Ser. No. 231,663, filed Aug. 12, 1988 as continuation-in-part of U.S. Ser. No. 039,744, filed Apr. 20, 1987 now abandoned; U.S. Ser. No. 140,208, filed Dec. 31, 1987 now abandoned; U.S. Ser. No. 149,589, filed Jan. 28, 07/099,923, filed Sept. 23, 1987 now U.S. Pat. No. 4,840,808; U.S. Ser. No. 323,880, filed May 19, 1988; U.S. Ser. No. 342,236, filed Apr. 24, 1989 now U.S. Pat. No. 4,956,190. The foregoing patent applications are incorporated herein by reference. The high fiber content and reducing agent combination of the present invention is also operative with the inventions of the foregoing patent applications.

DETAILED DESCRIPTION OF THE INVENTION

The present invention relates to pasta products such as macaroni, spaghetti noodles and the like in which bulk is increased, calories decreased and texture improved by replacing a portion of the edible flour with a source of added fiber. It has been found that fiber sources, such as for example, corn fiber, oat fiber, cellulose, pea fiber, and soy fiber, when treated according to the process of the present invention, can be incorporated into pasta dough at amounts up to about 30% by weight with surprising improvement in the texture, flavor, and color retention of the final, low calorie, cooked pasta product.

The process of the present invention by which the texture of the high fiber content pasta is significantly improved relates to the use of a reducing agent to treat the added fiber product. In order to supply the food industry with fiber sources which are acceptable in color, fiber product manufacturers generally utilize bleaching agents to lighten the color. The bleaching agents leave the surface of the fiber product highly oxidative. The presence of the oxidizers in or on the fiber product tends to produce unacceptable texture in pasta products incorporating the added fiber products. Furthermore, the oxidizers on the added fiber act on the gluten in the pasta to inhibit the formation of a strong encapsulation of starch and added fiber granules by the gluten. This results in "balling up" of starch and added fiber as the gluten is oxidized. The "balling up" of the starch and added fiber produces unacceptable pasta with a rough grainy texture and poor mouth feel. In addition, the oxidizers on the fiber attack the barrels of the pasta extruders thereby removing metal from the surface, which metal gets into the pasta creating an undesirable grey color and potential health hazard.

By the present invention, reducing agents are used to at least partially neutralize or otherwise counteract the oxidizers in or on the added fiber source to produce a high fiber pasta product which is superior in texture and color to other fiber-containing pastas. The reducing agents as used herein neutralize or essentially neutralize oxidizers on the added fiber source.

Thus the present invention relates to a method for preparing low calorie pasta product comprising the steps (a) preparing low calorie pasta dough comprising glutinous flour, a source of added fiber, a reducing agent, and water, and (b) forming the low calorie pasta dough into a desired shape, whereby a pasta containing added fiber is provided which exhibits improved texture and color.

By "reducing agent" herein is meant any compound, chemical, agent, mixture, or substance which can neutralize, remove, stabilize or otherwise inactivate the oxidizing surface properties of the fiber product incorporated into the pasta. It has been discovered that sulfur-containing materials are preferred reducing agents. Particularly effective as reducing agents in the present invention are sulfhydryl reducing agents, sodium metabisulfite, $SO_2$ or $SO_2$-generating precursors, and the like.

Sulfhydryl compounds are among the effective reducing agents in the present invention. Examples of sulfhydryl reducing agents useful in the process of the present invention include cysteine, water soluble cysteine salts, such as L-cysteine hydrochloride, hydrogen sulfide and glutathione. Sulfhydryl reducing agents are compounds containing —SH groups or compounds which are capable of initiating reactions which reduce —S—S— bonds in gluten to form —SH groups. Sulfur-containing materials, such as the sulfite salts and sulfur dioxide which may not contain a —SH group per se, are operative herein as reducing agents if upon exposure to moisture, either liquid or vaporous, a —SH group, such as in sulfurous acid, is produced. Satisfactory reducing agents according to the invention also include compounds related to or homologous with L-cysteine hydrochloride, such as D and DL cysteine hydrochloride, the free bases of L, D and DL cysteine, L-cysteine mono-phosphate, di-L-cysteine sulfite and L-mono-cysteine tartrate. Various sulfite salts such as potassium bisulfite and sodium or potassium sulfite can be used in place of sodium bisulfite. Related compounds such as hydrosulfite and pyrosulfite salts may also be employed as reducing agents to neutralize the fiber product oxidizers. Natural foods and other sources of the above compounds may also be used herein. Such a natural food source can include, for example, purified wheat germ fraction which contains glutathione.

All of these reducing agents are utilized herein in non-toxic amounts and do not form any known toxic or otherwise objectionable by-products with the other materials, if any, in the fiber products or the glutinous flour. The reducing agents have no known detrimental effect upon flavor, nutritional value or other essential properties of the edible flour or subsequent food product, such as pasta. The reducing agents may be utilized in the present invention either singularly or in combination to diminish or eliminate the presence or effect of oxidizers on or in the added fiber product.

In one embodiment of the present invention, the reducing agent is preferably dissolved or dispersed in the water used to create the paste from the flour and added fiber source. The amount of reducing agent present will vary depending on the amount of added fiber source incorporated into the pasta, the amount and kind of oxidizer present on the fiber source and the degree of texture and color improvement sought in the final pasta product. The amount of reducing agent is an amount sufficient to at least neutralize or essentially neutralize a sufficient amount of the oxidizing agents present in or on the added fiber source to produce improved pasta texture and mouth feel. Excess reducing agent is acceptable. The amount of reducing agent can therefore range, for example, from about 150 ppm to about 5000 ppm based on the weight of the paste. A preferred range for the amount of reducing agent is from about 1000 ppm to 2500 ppm based on the weight of the paste. Without the reducing agent, high fiber pasta is very grainy and rough with poor mouth feel.

The presence of the reducing agent in the high fiber pasta product also serves to protect the edible material from chemical or photo degradation of natural vitamins and coloring agents, including but not limited to carotenoids (such as beta-carotene), chlorophylls, xanthophylls, and the related lipoxidase-linoleate system. It is believed that a sulfhydryl reducing agent also plasticizes or otherwise modifies the protein in the outer layers of the wheat grain to thereby facilitate improved pasta texture, and increase extrusion rates. The presence of one or more reducing agents in the dough provides high fiber content pasta which is extrudable at solids levels higher than high fiber-containing pasta dough produced in the absence of a reducing agent. This is surprisingly achieveable by the viscosity reduction provided to alimentary paste produced by the present inventive process.

By "flour" herein is meant the glutinous and/or farinaceous flour obtained from the milling of grains such as durum wheat, said flour including but not limited to durum flour and semolina flour. Semolina is the food prepared by grinding and bolting cleaned durum wheat to such fineness that when tested by the method prescribed in 21 CFR section 137.300(b)(2), it passes through a No. 20 sieve, but not more than 3 percent passes through a No. 100 sieve. The semolina is freed from bran coat or bran coat and germ to such extent that the percent of ash therein, calculated to a moisture-free basis, is not more than 0.92 percent. Durum flour has not less than 98 percent passing through the No. 70 sieve. The present invention, however, is not limited to semolina or durum flour and is operative for mixtures of added fiber product and edible flours obtained from the milling of various wheat grains and fractions or combinations thereof.

The added fiber sources useful herein can be corn fiber, oat fiber, cellulose, methyl-cellulose, microcrystalline cellulose, pea flour, soy flour, soy bean flour, oil seed endosperm cell wall residue, soy bean hulls, oat hulls, wood pulp, peanut shells, melon rind, spinach, beet fiber, cucumber and mixtures thereof. Guar gum is also considered operative herein as a fiber source because it contains approximately 85% fiber even though it has relatively higher solubility in water than the other fiber sources discussed above.

The components of the high fiber, low calorie pasta products of the present invention can be present in the product in amounts without any known limitation. In a preferred embodiment, the low calorie high fiber pasta product is prepared from an alimentary paste comprising edible flour, water, and an added fiber source selected from corn fiber, corn bran, oat fiber, cellulose, methyl-cellulose, microcrystalline cellulose, pea fiber, soy fiber, soy bean flour, oil seed endosperm cell wall residue, soy bean hulls, oat hulls, wood pulp, peanut shells, melon rind, spinach, beet fiber, cucumber, or guar gum. Preferred ranges of the components in the dough or paste are edible flour, from about 30 to about 85 parts by weight; added fiber product, from about 1 to about 30 parts by weight; added water, from 0 to 35 parts by weight; reducing agent, preferably dissolved or dispersed in the water, in an amount ranging up to about 5000 ppm; optional additives, from 0 to 10 parts per hundred.

Various optional additives can also be incorporated into the low calorie, high fiber, pasta products of the present invention. These optional additives can include, for example, but are not limited to, gums, such as vegetable gums, flavorants, colorants, emulsifiers, malt, annatto powder, triethyl citrate, viscosity modifiers, salts, glycerol monostearate, yeast, sugar, shortening albumin, whole eggs, egg whites, egg yolks, whey proteins, soybean isolate, gluten, legumes, hydrolyzates from vegetable and animal origins, vegetable oils, milk solids, vitamins, and the like. Triethyl citrate is particularly effective in improving the texture of the pasta particularly when combined with whole eggs or egg whites. A preferred embodiment utilizes triethyl citrate mixed in egg whites at a level of from about 100 to 500 parts per million, and wherein the egg white/triethyl citrate mixture is added to the flour at 0.5% to 5% by weight. Low temperature coagulatable protein materials may be added and serve to enhance the pasta's resistance to starch leaching in cold water or milk. Such low temperature coagulatable protein materials can include a functional protein source such as albumin, whole eggs, egg whites, egg yolk, soybean isolate, whey protein concentrate, and mixtures thereof. When used, the protein material comprises u to about 3% by weight of the alimentary paste. It is preferred in the present invention that the addition of optional additives not cause the pH of the pasta dough or paste to become too basic. Thus, it is preferred that the pH of the pasta dough or paste remain less than or equal to about 7.0.

Additional additives operative herein to increase bulk and thereby reduce caloric density can include, for example, calcium carbonate and disodium phosphate at levels up to, for example, 1% by weight.

When frozen egg whites are incorporated into the low calorie high fiber pasta dough, additional process water is not required since the frozen egg whites generally contain 85-90% water. In such formulations, the reducing agent can be dry blended with the flour.

The low calorie high fiber pasta dough is then formed into a desired shape. By "formed" or "forming" herein is meant extruded, sheeted, rolled, stamped, pressed or otherwise shaped. The shape of the low calorie high fiber pasta product can include spaghetti, linguini, rotini, elbows, spirals, shells, conchiglioni, ziti, vermicelli, fusilli, fettucine, tortellini, ravioli, manicotti, lasagna, rote, tortiglioni and mixtures thereof.

The low calorie high fiber pasta dough, which has been formed into a shape, can be dried conventionally or by the techniques described in copending applications U.S. Ser. No. 07/231,663 filed Aug. 12, 1988; U.S. Ser. No. 225,211 filed July 28, 1988; and U.S. Ser. No. 323,000 filed Mar. 15, 1989 now U.S. Pat. No. 4,948,532.

The high fiber pasta product of the present invention can be cooked by exposure to moisture and heat where the heat can be, for example, boiling water, steam, microwave radiation, etc. Preferred methods of heating to cook include immersion in boiling water and microwave heating. Heating by microwave irradiation has the advantage of eliminating the need for draining the high fiber, low calorie pasta after cooking, which not only offers convenience and improved safety but also reduces the loss of water-soluble vitamins, color, minerals and other nutrients. By judicious choice of the volume of liquid added, no draining is required after cooking.

In another embodiment, the invention pertains to a shelf stable, microwave cookable prepackaged low calorie pasta product. By "shelf stable" is meant that the packaging protects its contents from degradation under non-refrigerated conditions (i.e., above 40° F. (4.4° C.) for a time period of up to about 36 months time, or under refrigerated conditions (i.e., below 40° F.) for up to about 60 days. The package preferably contains uncooked low calorie high fiber pasta and optinally a sauce. The pasta may be packaged dry in a conventional container, microwavable carton or tray, or sealed in vapor barrier plastic pouches, which packages are disclosed in application U.S. Ser. No. 195,083, filed May 19, 1988 now abandoned, herein incorporated by reference.

A sauce may also be added to the low calorie high fiber pasta product of the present invention. The sauce may be a dehydrated one which contains either a natural or artificial flavoring and which may contain the flavor of cheese, cream, butter, tomato sauce, or any other desired flavoring, and which is hydratable by addition of small amounts of warm or cold liquid. The cheese of the sauce can be prepared by the methods disclosed in copending applications U.S. Ser. No. 043,317 titled "Improved Non-Bitter Enzyme Modified Cheese Flavoring Material and Spray Dried Product", filed Apr. 28, 1987 now U.S. Pat. No. 4,853,232, or U.S. Serial No. 336,502 titled "A Process For The Preparation Of Improved Non-Bitter Enzyme Modified Cheese Flavoring Material and Spray Dried Product", filed Apr. 11, 1989 now U.S. Pat. No. 4,898,739, which are incorporated by reference herein. Alternatively, a water-based liquid such as milk or broth may be used to hydrate the sauce. The sauce, whether dehydrated or prehydrated, may be packaged separately from the pasta for separate cooking or may be premixed with the pasta.

The low calorie high fiber pasta product is preferably packaged in any packaging in which the product is shelf stable and which is microwave safe and penetrable. Such packaging includes cardboard or plastic. The packaging may comprise individual portions (e.g., of 3 to 4 ounces each), family-size portions or bulk portions (e.g., of 5 to 10 pounds) for institutional use.

The microwave cookable prepackaged product may be prepared by adding non-boiling water or other liquid, e.g. tap water, soup, broth, milk, etc., to either each of the separate packages for the sauce and pasta or, preferably, directly to the package itself containing a mixture of the two. The amount of added liquid should be sufficient to hydrate the pasta and dry sauce mix but preferably small enough that, after cooking, essentially all of the liquid is absorbed into the product so that draining of excess liquid is not necessary.

According to this embodiment, the liquid should be added to the pasta and/or sauce, if any, and then the mixture subjected to microwave heating for a period of time sufficient to completely cook the product (e.g. up to about 10 minutes). If the pasta remains in contact with the liquid for a longer period of time, i.e. sufficient to more fully hydrate it, microwave cooking may be accomplished in one to two minutes. After cooking in a microwave oven, the high fiber, low calorie pasta product is in a consumable, servable stage.

Thus the high fiber, low calorie pasta product of the present invention can be packaged in a microwavable package whereby an amount of liquid sufficient to hydrate, and facilitate microwave cooking, is added. Exposure of the hydrated high fiber, low calorie pasta product to microwave radiation produces a cooked, no drain casserole-type pasta product with high fiber content and reduced calorie content relative to conventional pasta. Thus a shelf stable, microwave cookable, prepackaged high fiber, low calorie pasta product containing uncooked pasta and optionally a flavorant or sauce (liquid or dehydrated) capable of preparation to a consumable servable stage by addition of liquid thereto and cooking in a microwave oven, is also provided by the present invention.

The following Examples are provided to further demonstrate and illustrate the invention. In the Examples and throughout the specification, all temperatures are expressed in degrees Farenheit unless otherwise indicated. The Examples are not to be viewed as a limitation of the invention, as it is contemplated that modifications will readily occur to those skilled in the art, which modifications are within the spirit of the invention and the scope of the appended claims.

EXAMPLE I

The following dry ingredients were pre-blended in a vertical cutter Hobart mixer in the amounts (in grams) shown in Table I; durum flour, fiber, calcium carbonate, vital wheat gluten, annatto powder (colorant), and malt (flour enhancer). The liquid phase was then added which included either the water and sodium metabisulfite (Examples II-VI and VIII - XII) or the frozen egg whites (Example I). In Example I the sodium metabisulfite was dry blended with the other dry ingredients before the frozen egg whites were added. Example VII is a control sample lacking reducing agents. The pastes thus produced were extruded into elbow macaroni shape, dried at 135° F. and 70% relative humidity for 12 hours. The dried pasta was then tested for moisture, fat, protein, fiber and calories.

TABLE I

|  | % Total Solids | I | II | III | IV | V | VI |
|---|---|---|---|---|---|---|---|
| Durum Flour | 87.5 | 2600.00 | 2581.00 | 2676.00 | 2648.00 | 2677.00 | 2686.00 |
| Semolina | 86.0 | — | — | — | — | — | — |
| Corn Flour | 95.0 | — | — | — | — | — | 386.00 |
| Oat Fiber | 95.0 | — | — | 363.00 | — | — | — |
| Cellulose | 95.0 | — | — | 389.00 | — | — | — |
| Pea Fiber | 93.0 | 256.00 | 256.00 | — | — | 403.00 | — |
| Soy Fiber | 95.0 | 318.00 | 318.00 | — | — | — | — |
| Guar Gum | 93.0 | — | — | 141.00 | 141.00 | 141.00 | 141.00 |
| Calcium Carbonate | — | 30.00 | 30.00 | 30.00 | 30.00 | 30.00 | 30.00 |
| Sodium Meta-bisulfite |  | — | 1.00 | 1.00 | 2.00 | 2.00 | 2.00 |
| Vital Wheat Gluten | 93.5 | — | 169.00 | 160.00 | 160.00 | 128.00 | 128.00 |
| Egg Whites (Frozen) | 11.5 | 1200.00 | — | — | — | — | — |
| Annatto Powder | — | — | — | 0.15 | 0.15 | 0.15 | 0.15 |
| Malt | 90.0 | 15.00 | 15.00 | — | — | — | — |
| Water | — | — | 780.00 | 913.85 | 915.85 | 904.85 | 912.85 |

|  | VII (Control) | VIII | IX | X | XI | XII |
|---|---|---|---|---|---|---|
| Durum Flour | 2699.00 | 2697.00 | 2697.00 | 2623.44 | — | — |
| Semolina | — | — | — | — | 2751.76 | 2751.76 |
| Corn Flour | — | — | — | — | — | — |
| Oat Flour | — | — | — | — | — | — |
| Cellulose | — | — | — | — | 358.66 | 388.66 |
| Pea Fiber | — | — | — | — | — | — |
| Soy Fiber | 374.00 | 374.00 | 420.00 | 478.72 | — | — |
| Guar Gum | 141.00 | 141.00 | 95.00 | 140.64 | 140.60 | 140.60 |
| Calcium Carbonate | 30.00 | 30.00 | 30.00 | 30.00 | 30.00 | — |
| Sodium Meta-bisulfite | — | 2.00 | 2.00 | 1.00 | 1.00 | 1.00 |
| Vital Wheat Gluten | 160.00 | 160.00 | 160.00 | 84.50 | 126.00 | 126.00 |
| Egg Whites (Frozen) | — | — | — | — | — | — |
| Annatto Powder | 0.15 | 0.15 | 0.15 | — | 0.10 | 0.10 |
| Malt | — | — | — | 15.00 | 15.00 | 15.00 |
| Water | 913.56 | 913.56 | 913.56 | 852.00 | 863.20 | 863.20 |

TABLE II

|  | EXAMPLE NUMBERS ||||||
|---|---|---|---|---|---|---|
|  | II | IX | X | XI | XII | VII (CONTROL) |
| % Moisture | 10.00 | 10.00 | 10.00 | 10.00 | 10.00 | 10.00 |
| % Total Dietary Fiber | 6.48 | 15.01 | 18.25 | 16.71 | 18.39 | 3.32 |

TABLE II-continued

|  | II | IX | X | XI | XII | VII (CONTROL) |
|---|---|---|---|---|---|---|
| % Protein | 15.26 | 14.73 | 17.74 | 13.46 | 13.52 | 11.43 |
| % Fat | 1.83 | 2.12 | 1.65 | 1.96 | 1.86 | 1.68 |
| % Ash | 1.67 | 1.59 | 2.01 | 1.35 | 0.69 | 0.81 |
| % Carbohydrates | 64.56 | 56.55 | 50.35 | 56.52 | 55.54 | 72.77 |
| Calories in 2 oz. at 10% moisture | 190.36 | 172.46 | 162.85 | 168.44 | 166.12 | 199.51 |

Analysis of Examples

Examples II, IX, X, XI, XII from above were analyzed for percent moisture, precent total fiber, percent protein, percent fat, percent ash, percent carbohydrates, and calorie content in a two ounce sample at 10% moisture. The results are shown in Table II. Also shown are the results of the same tests performed on a control sample (VII) in which no added fiber was incorporated. The results show significant increases in the total dietary fiber content and protein content of the inventive samples relative to the control sample. The results also show significant reductions in the carbohydrate content and calorie content of the inventive samples relative to that of the control sample (VII).

Table III shows the subjective analyses of six experienced pasta tasters with regard to the texture and color of the fiber-containing pasta of the present invention (Example VIII) compared to a fiber-containing pasta control sample prepared without sodium meta-bisulfite as a reducing agent (Example VII).

The panelists were given pasta prepared by the formulations in Examples VII and VIII of Table I, wherein Example VIII has sodium meta-bisulfite at a level of 2 grams per 3000 grams of pasta dough. The pasta was presented to each panelist as a dry sample for analysis as to color and a sample after boiling for seven minutes for texture analysis. The panelists were experienced food tasters and were asked to rate the pasta color and texture on a scale of 1 (poor) to 5 (excellent).

The results show a consistent preference by the members of the test panel for the high-fiber pasta of the present invention (Example VIII) over the high fiber pasta produced without sodium meta-bisulfite (Example VII).

TABLE III

| Panelist | EXAMPLE VII Evaluation | | EXAMPLE VIII Evaluation | |
|---|---|---|---|---|
|  | Color | Texture | Color | Texture |
| 1 | 2.5 | 3.0 | 4.0 | 3.5 |
| 2 | 2.0 | 3.0 | 4.0 | 3.5 |
| 3 | 2.5 | 2.5 | 3.0 | 3.5 |
| 4 | 2.0 | 3.0 | 4.0 | 4.0 |
| 5 | 3.0 | 3.0 | 4.0 | 3.0 |
| 6 | 1.5 | 2.0 | 3.0 | 2.5 |
| Average | 2.3 | 2.8 | 3.7 | 3.3 |

That which is claimed is:

1. A method for preparing low calorie high fiber-containing pasta product comprising the steps:
    (a) combining glutinous flour, a source of added fiber, a reducing agent, and water, wherein the reducing agent is present in an amount sufficient to at least essentially neutralize a sufficient amount of the oxidizing agents present in the fiber source to thereby produce improved pasta texture; and
    (b) forming the product of step (a) into a desired shape;
whereby a pasta containing added fiber is produced which when cooked exhibits improved texture and color.

2. The method of claim 1 wherein the glutinous flour is present in an amount of from 70 to 99 percent on a dry weight basis.

3. The method of claim 1 wherein the source of added fiber product is present in an amount of from about 1 to about 30 percent on a dry weight basis.

4. The method of claim 1 wherein the source of added fiber is selected from the group consisting of corn fiber, corn bran, oat fiber, cellulose, methyl-cellulose, microcrystalline cellulose, pea fiber, soy fiber, soy bean flour, oil seed endosperm cell wall residue, soy bean hulls, oat hulls, wood pulp, peanut shells, melon rind, spinach, beet fiber, cucumber, guar gum and mixtures thereof.

5. The method of claim 1 wherein the reducing agent is selected from the group consisting of sulfhydryl compounds, sodium metabisulfite, sulfurous acid, and $SO_2$-generating precursors.

6. The method of claim 1 wherein the reducing agent is selected from the group consisting of sulfur dioxide, L-cysteine hydrochloride, hydrogen sulfide, glutathione, cysteine, L-cysteine tartrate, and di-L-cysteine sulfite.

7. The low calorie pasta product produced by the method of claim 1.

8. The low calorie pasta product of claim 7 prepared from an alimentary paste in which the glutinous flour is durum flour present at an amount ranging from about 30 to about 85 parts per hundred by weight, and wherein the source for added fiber is present at an amount ranging from about 1 to about 20 parts per hundred by weight, and wherein the reducing agent is present at an amount ranging up to about 5000 ppm based on the weight of the dough.

9. The low calorie pasta product of claim 8 further comprising a functional protein source selected from the group consisting of albumin, egg whites, egg yolk, gluten, soybean isolate, whey proteins, legumes, and hydrolyzates from vegetable or animal origins.

10. The low calorie pasta product of claim 8 further comprising from about 11% to about 30% by weight water.

11. The low calorie pasta product of claim 7 prepared from an alimentary paste in which the glutinous flour is semolina flour present at an amount ranging from about 30 to about 85 parts per hundred by weight, and wherein the added fiber source is present at an amount ranging from about 1 to about 20 parts per hundred by weight and wherein the reducing agent is present at an amount ranging from about 150 ppm to about 1500 ppm based on the weight of the paste.

12. The low calorie pasta product of claim 11 further comprising a functional protein source selected from the group consisting of albumin, egg whites, egg yolk, gluten, whey proteins, soybean isolate, legumes, and hydrolyzates from vegetable or animal origins.

13. The low calorie pasta product of claim 11 further comprising from about 11% to about 30% by weight water.

14. A low calorie high fiber pasta product prepared from an alimentary paste comprising glutinous flour, a source of added fiber, a reducing agent, and water, wherein the reducing agent is present in an amount sufficient to at least essentially neutralize a sufficient amount of the oxidizing agents present in the fiber source to thereby produce improved pasta texture.

15. The low calorie high fiber pasta product of claim 14 prepared from an alimentary paste comprising:
   (i) between about 65% and about 90% by weight of the solids portion of durum flour having a moisture content in the range of between about 11% and about 14% by weight;
   (ii) between about 1% and 20% by weight of an added source of fiber.
   (iii) between about 0% and about 2% by weight of glycerol monostearate;
   (iv) between about 0% and about 3.0 by weight of a low temperature coagulatable protein material;
   (v) between about 0% and 5% by weight of a mixture of triethyl citrate and egg whites, wherein the triethyl citrate is present in the mixture at a level from about 100 to 500 parts per million; and
   (vi) a reducing agent present in an amount sufficient to at least essentially neutralize a sufficient amount of the percent in oxidizers of the fiber source to produce improved pasta texture.

16. The low calorie pasta product of claim 14 wherein the reducing agent is selected from the group consisting of sulfhydryl compounds, sodium meta bisulfite, sulfurous acid, and $SO_2$-generating precursors.

17. The low calorie pasta product of claim 14 wherein the added fiber source is selected from the group consisting of corn fiber, corn bran, oat fiber, cellulose, methyl-cellulose, microcrystalline cellulose, pea flour, soy fiber, soy bean flour, oil seed endosperm cell wall residue, soy bean hulls, oat hulls, wood pulp, peanut shells, melon rind, spinach, beet fiber, cucumber, and guar gum.

18. The low calorie, high fiber pasta product of claim 14 packaged in a microwavable container.

19. The low calorie high fiber pasta product of claim 18 wherein said container further contains a prepackaged flavorant.

20. The method of claim 1 further comprising step (c) drying the low calorie pasta shape of step (b) to form a low calorie pasta product.

21. The method of claim 20 further comprising step (d) heating the pasta resulting from step (c) for a period of time sufficient to cook said pasta.

22. A microwave cookable, low calorie high fiber pasta product prepared from an alimentary paste comprising glutinous or farinaceous flour, a source of added fiber, water, and a reducing agent present in an amount sufficient to at least essentially neutralize a sufficient amount of the oxidizing agents present in the fiber source to thereby produce improved pasta texture, wherein said pasta product is capable of preparation to a consumable, servable stage by addition thereto of liquid and exposing the pasta product and liquid to microwave radiation wherein said pasta is cooked, wherein the cooked high fiber low calorie pasta has improved texture relative to high fiber pasta prepared without a reducing agent.

23. A shelf stable packaged microwavable low calorie high fiber pasta product comprising:
   (a) a liquid impervious package suitable for insertion in a microwave oven, able to tolerate the temperatures reached in the microwave cooking of pasta and bearing indications that its contents may be cooked in a microwave oven and
   (b) an uncooked low calorie high fiber pasta comprising glutinous or farinaceous flour, a source of added fiber, a reducing agent, and water, wherein the reducing agent is present in an amount sufficient to at least essentially neutralize a sufficient amount of the oxidizing agents present in the fiber source to thereby produce improved pasta texture.

24. The shelf stable packaged microwavable low calorie high fiber pasta product of claim 23 further comprising a dehydrated sauce intimately mixed with the uncooked pasta.

25. The shelf stable packaged low calorie high fiber pasta food product of claim 24 wherein the dehydrated sauce includes the flavor of cheese, cream, butter or tomato.

26. The shelf stable packaged pasta food product of claim 23 wherein the package bears indicia communicating that its contents may be cooked in a microwave oven.

* * * * *